United States Patent [19]
Swander, Jr. et al.

[11] 3,712,181
[45] Jan. 23, 1973

[54] INTERNAL AIR ASSISTED BRAKE ACTUATOR

[75] Inventors: Kenneth D. Swander, Jr., Prairie Village; Ronald D. Wilkins, Overland Park, both of Kans.

[73] Assignee: Certain-Feed Products Corporation, Ardmore, Pa.

[22] Filed: June 1, 1971

[21] Appl. No.: 148,921

Related U.S. Application Data

[63] Continuation of Ser. No. 782,131, Dec. 9, 1968, abandoned.

[52] U.S. Cl. ............................92/63, 92/64, 92/130, 188/170, 267/65 R
[51] Int. Cl. ............................F01b 7/00, F01b 21/02
[58] Field of Search ......188/170; 92/62, 63, 64, 130; 91/416, 422; 267/65, 65 A, 65 R, 65 B; 60/54.5 PM

[56] References Cited

UNITED STATES PATENTS

| | | | |
|---|---|---|---|
| 3,302,530 | 2/1967 | Dobrinkin et al. | 92/63 X |
| 3,065,997 | 5/1963 | Hoppenstand | 92/64 X |
| 3,229,589 | 1/1966 | Langas | 91/422 |
| 3,232,180 | 2/1966 | Deschenes | 91/422 |
| 3,232,181 | 2/1966 | Blatt | 91/422 |
| 3,264,951 | 8/1966 | Dobrikin | 92/64 |
| 3,316,817 | 5/1967 | Ellis | 91/422 X |
| 3,331,291 | 7/1967 | Rumsey | 92/64 |
| 3,479,927 | 11/1969 | Woodward | 92/64 |
| 3,065,997 | 11/1962 | Frankhouser et al. | 92/64 |
| 3,090,359 | 5/1963 | Hoppenstand | 92/64 X |

*Primary Examiner*—Martin P. Schwadron
*Assistant Examiner*—A. Hershkovitz
*Attorney*—Thomas M. Scofield

[57] ABSTRACT

A spring emergency and parking brake which is further air-assisted for added force in the application of the spring emergency brake; that is, there is a combination of air and spring pressure utilized to apply the brakes in an emergency situation when the primary or service air source, normally employed in operating the brakes, fails in one way or another. The source of the air-assisting force is internal to the brake actuator housing and derives from the air used to compress the emergency spring.

34 Claims, 3 Drawing Figures

INVENTOR
Kenneth D. Swander, Jr.
Ronald D. Wilkins
BY Scofield, Kokjer, Scofield & Lowe
ATTORNEYS

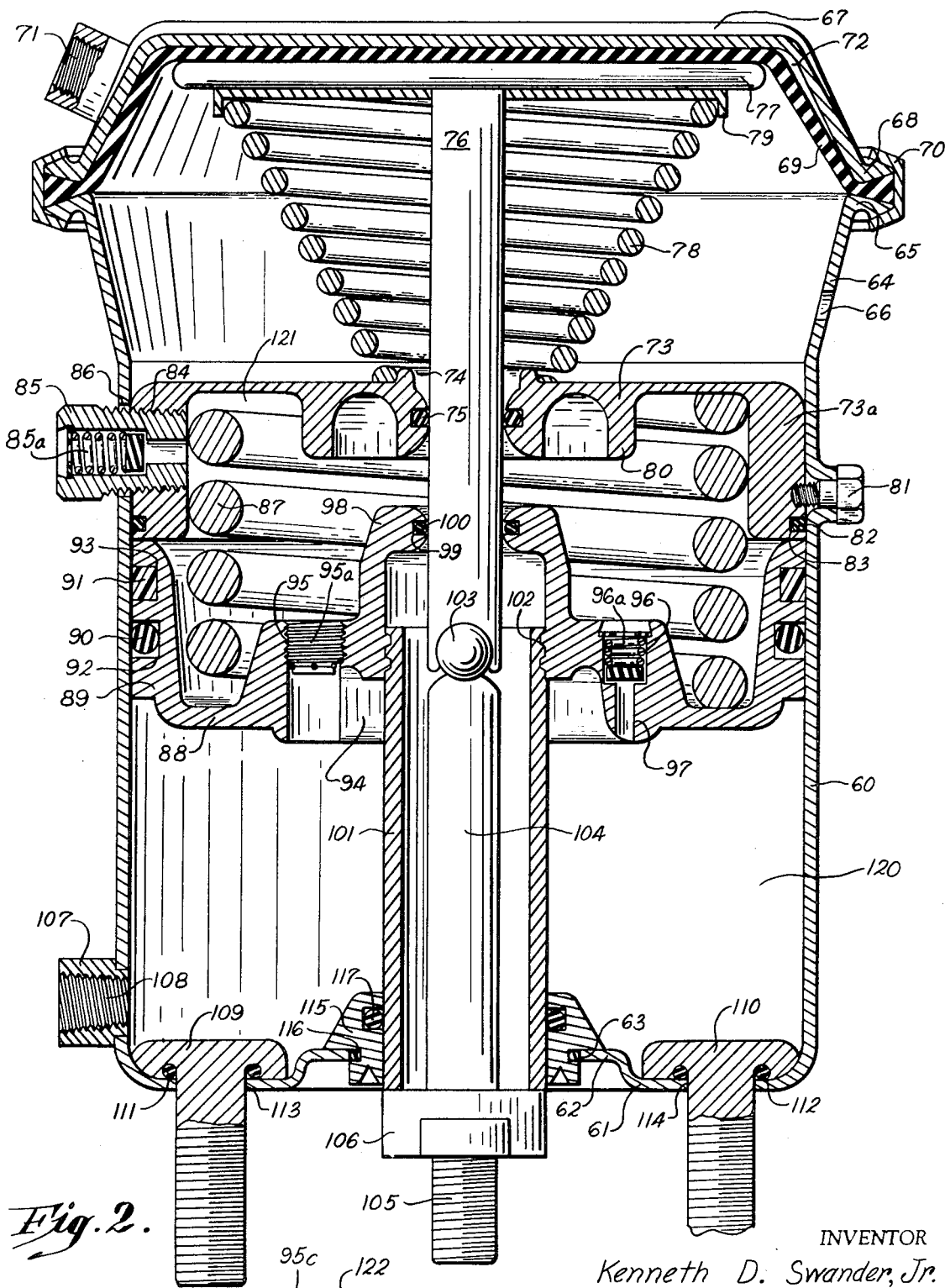

INTERNAL AIR ASSISTED BRAKE ACTUATOR

This application is a continuation of Ser. No. 782,131, filed Dec. 9, 1968, now abandoned.

BACKGROUND AND SUMMARY OF THE INVENTION

The patent to Hoppenstand, U.S. Pat. No. 3,090,359, issued May 21, 1963, "Double Air Chamber Brake Cylinder" disclosed (FIG. 4) the use of a supplemental air source to assist a spring emergency brake.

In the normal operation of air brakes for trucks, buses, trailers and the like, the service brake, usually a diaphragm acting on a brake rod, is designed to work at 60 percent of the gross weight of the vehicle on the axle. For a secondary stopping force, that is, the emergency spring, 20 per cent retarding force is usually regarded as adequate. For parking the vehicle, a 20 per cent retarding force is regarded to be adequate in order to be able to handle a 20 per cent grade.

It is considered highly desirable to be able to provide a secondary stop means which will be at least 80 per cent as effective as the service brake or provide a retardation force equal to 48 percent of the vehicle weight. It is thus that the air-assist concept has come into being to be used in combination with the spring emergency effect. To utilize air-assist in combination with the spring emergency systems available in the past, such as Hoppenstand, there must be provided an isolated reservoir of air. The amount of the supercharge thereof and the place the supplementary air is put must be independent of the basic air system. Valving and lines further must be provided wherein switching arrangements are available to charge the isolated air assist reservoirs and thereafter transfer this emergency air from its storage place to the brake actuator.

OBJECTS OF THE INVENTION

An object of the instant invention is to provide an air-assist function in a spring emergency and parking brake actuator which provides an additional force output to the spring brake actuator during an emergency stop.

Another object of the invention is to provide an air-assist function in a spring emergency and parking brake construction which is entirely internal to the spring emergency and parking brake actuator and neither has nor requires any external piping, valves or reservoirs whatsoever.

Another object of the invention is to provide an air-assist function for a spring emergency and parking brake actuator which gives an additional force output for emergency stopping without an increase in the actuator size, and without the use of additional air lines or controls.

Another object of the invention is to provide a spring emergency and parking brake actuator which is capable of being interchanged with existing actuators and systems yet wherein there is additionally provided a supercharge of the emergency stop cycle with air.

A further object of the invention is to provide means and methods for decreasing the system response time in an emergency situation in a vehicle utilizing a spring emergency and parking brake actuator system.

Another object of the invention is to provide a spring emergency and parking brake actuator construction wherein the air assist function is additive thereto, yet wherein exterior road contamination is entirely prevented from entering the spring cavity, whereby to improve seal and spring life.

Another object of the invention is to provide internal means for providing an air assist function to a spring emergency and parking brake actuator, whereby less expensive and lighter output power springs may be employed in the said actuator whereby to provide a safer brake means, under empty conditions.

Still another object of the instant invention is to provide an air assist function in a spring emergency and parking brake actuator which provides a stopping force which is great at first, then gradually slacks off as the speed of the vehicle decreases, much as a high speed controlled stop is preferably conducted in automotive vehicles. This higher force provides high deceleration at high speeds where high energy levels prevail and thus decreases stop distance.

A further object of the instant invention is to provide an air-assist function completely enclosed within the housing or body of a spring emergency and parking brake actuator wherein the air pressure from the basic air system used to compress the power spring is also used to charge the air-assist function; then, when normal air is lost from the basic air brake system, the charged air-assist chamber provides an air-assisted spring emergency stop in a controlled manner.

Other and further objects of the invention appear in the course of the following description thereof.

In the drawings, which form a part of the instant application and let it be read in conjunction therewith, embodiments of the invention are shown and, in the various views, like numerals are employed to indicate like parts.

FIG. 2 shows the subject internal air assisted brake actuator in the form wherein the spring emergency chamber is positioned inboard of the service chamber.

FIG. 3 shows a detailed view of the check valve mounted in the piston of FIG. 2.

THE BASIC ADD-ON BRAKE ACTUATOR CONSTRUCTION (FIG. 1)

Figure 1:
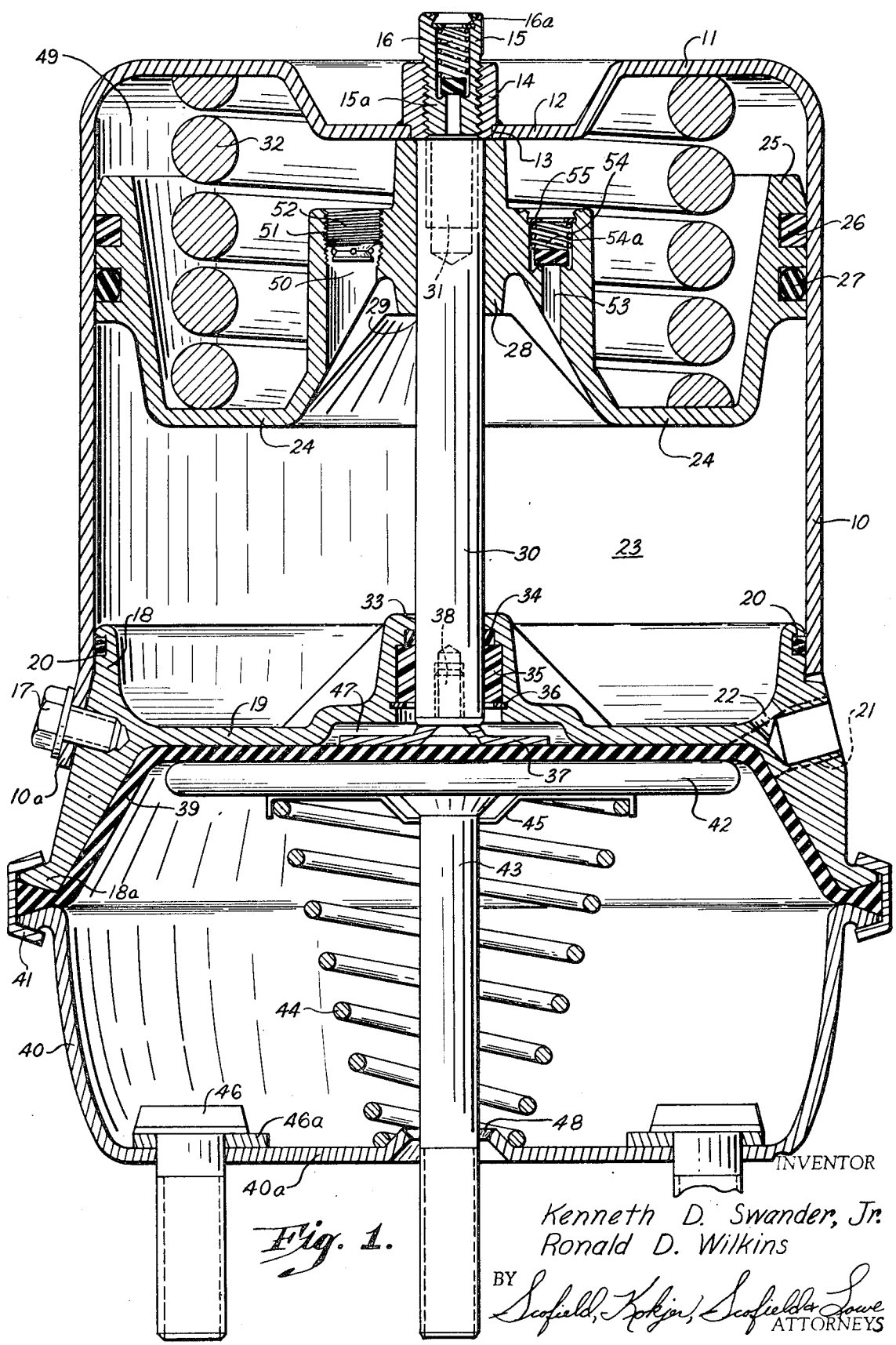
FIG. 1 is a cross sectional view of an add-on spring emergency and parking brake actuator to which has been added the internal air assist function which comprises the instant invention.

The general intent of all spring brake actuators is to provide a means for applying the foundation service brakes on one or more axles of the vehicle when same has lost its normal air pressure required to operate the service brake chamber. Under these conditions, it is considered operating an emergency brake. When the air pressure that is introduced to the spring mechanism air chamber is controlled by the driver and only exhausted after a vehicle is brought to a stop with its service brakes, then it is considered a parking brake.

"Add-on" units are basically spring brake chambers that are attached to a portion of the existing service brake chamber that is already mounted on the vehicle. The "add-on" type transfers the spring force through a sealed interwall, thence to the pressure side of the normal service brake diaphragm, then through the push rod and foundation brake mechanism to the brake shoes, whether it is a cam or a wedge brake mechanism. We will first describe the basic add-on actuator and then our improvements as applied thereinto.

Howze U.S. Pat. No. 2,854,954 issued Oct. 7, 1958 for "Vehicle Brake Operating Mechanism" shows the fundamental "Add-On" or "Piggy-back" type spring emergency and parking brakes.

Referring, then to FIG. 1, at 10 is seen the cylindrical side wall of a spring brake housing. In the view as seen in the drawing, downwardly therein is toward the axle or inwardly of the brake actuator system and upwards in the view is outwardly of the brake actuator system or away from the vehicle axle or brake drum. The outer wall, then, of the spring emergency housing 10 is seen at 11. It is preferably slightly dished centrally as at 12 and has a central opening therein 13 whereby to receive an internally threaded fitting 14. Fitting 14 receives a removable valve body 15 therein carrying centrally thereof vent valve 16, to be described. The inner end or skirt 10a of housing 10 is fastened by bolts 17 to the peripheral wall 18 of an interwall 19. The later is the inward termination of the spring emergency chamber and the outward boundary of the service chamber. Peripheral portion 18 of interwall 19 has circumferential seal 20 abutting the inner face of housing 10. An air input fitting 21 passes air in through passage 22 to reach the pressurization chamber 23 of the emergency spring housing.

Power piston 24 has peripheral skirt 25 thereon carrying pressure seal 27 and felt outer ring 26 therein whereby to ride in reciprocating motion against the inner face of housing 10. Piston 24 further has central hub 28 having a central opening 29 therethrough fixedly receiving push rod 30 therein. Push rod 30 may have an internally threaded recess 31 at the upper or outer end thereof, for receiving from outside wall 11 an externally threaded rod for a mechanical release function. This is conventional and will not be described. Power spring 32 abuts with its outward end the inner face of outer wall 11 and with its inner end the outer face of piston 24. A central opening 33 is provided through interwall 19 whereby push rod 30 may pass in sealed reciprocating fashion therethrough. Seal 34 and guide bushing 35 are retained by ring 36, seal push rod 30 through opening 33. A suitable pad or pressure face 37 is attached to the inner end of rod 30 by screw 38.

Referring now to the service chamber, the inward end 18a of peripheral portion 18 of interwall 19 abuts the outward peripheral surface of a resilient diaphragm 39. The latter is abutted on its inward peripheral face by service chamber housing member 40, the diaphragm and its abutting flanges being retained by clamp band 41, itself removable.

Diaphragm abutment pad 42 is attached to the outward end of brake rod 43 and abuts the inner face of diaphragm 39. Diaphragm return spring 44 abuts spring retainer 45 at its outer end and on its inner end faces against the end wall 40a of the service chamber member 40. Suitable bolts 46 and washers 46a serve to attach the brake actuator to suitable brackets on the vehicle.

A fitting, not shown, analogous to passage 22 is provided in interwall peripheral portion 18 whereby to input air from any suitable line source to the service chamber. The latter is generally designated 47 and lies between the outer face of diaphragm 39 and the inner face of interwall 19. An opening 48 is provided centrally of inner wall 40a of the service brake chamber whereby brake rod 43 may pass therethrough to make its conventional operating connection with the brake elements.

All of the above, with the exception of valve 16 and fittings 15 and 14 are characteristic of a typical "Add-On" spring emergency brake unit as is seen in Howze, supra.

ADD-ON EMERGENCY BRAKE FUNCTION

Compressed air to spring chamber 23 enters through tapped hole or fitting 21 and air passage 22. When sufficient pressure of air is present in chamber 23, piston 24 is forced upwardly or outwardly as shown in FIG. 1. This compresses power spring 32 and also brings disc or pressure plate 37 on rod 30 upwardly or outwardly in the view, close to interwall 19.

When power spring 32 is compressed, the service brake works in the normal manner, that is, under the influence of air pressure in service chamber 47 acting on flexible diaphragm 39. When air pressure in chamber 47 is increased, diaphragm 39 is forced downwardly or inwardly in the view of FIG. 1, moving push rod 43 and pad 42 whereby to apply the brake. Under these conditions, piston 24 and piston rod 30 remain as shown in FIG. 1. When pressure is reduced in service chamber 47, diaphragm 39 moves upwardly or outwardly to the position shown in FIG. 1. Push rod 43 moves upwardly along with it, forced by diaphragm return spring 44. This releases the brake.

When air is released from chamber 23, the power spring 32 forces piston 24, push rod 30 and pressure plate 37 downwardly in the view of FIG. 1, thereby applying the brakes. The brakes can be released only by reinstating the air pressure in chamber 23 or by using a mechanical release means as has been, in the art and will not be shown or described here. Such may be seen in the application of Swander Jr., et al., Ser. No. 520,693, filed Jan. 14, 1966 for "Brake Actuator", now abandoned.

THE AIR-ASSIST APPARATUS

In a typical add-on unit as seen in Howze, supra or Swander et al., supra, the spring cavity 49 (the space defined between the inner face of outer wall 11 and the outer face of piston 24) is usually vented by an opening typically provided in outer wall 11. However, in the instant construction, spring cavity 49 is sealed and there is no vent provided save for opening 13 which receives fitting 14 and valve body 15 therein. There is provided, through valve body 15, passage 15a which is enlarged at its upper end and removably receives vent valve 16 therein, retained in the upper or outer portion of passage 15a by ring 16a. Vent valve 16 typically will open to vent passage 15a from inside the spring cavity at approximately 35 psi.

A passage 50, internally threaded at its outward or upward end 51, is provided through piston 24 radially outwardly of hub 28. Removably threaded into passage 50 is check valve 52 (checking flow from chamber 23 into cavity 49). The latter comprises a cylindrical externally threaded fitting having a passage extending thereinto centrally thereof from its upper or outer end, the passage blanked at the lower end with outwardly extending radial ports or passages which are sealed by an O-ring at its lower or inner lesser diameter end.

A second passage 53, also enlarged at its outer or upper end, in the view of FIG. 1, has inlet valve generally designated 54 retained in the enlarged portion therein by retainer ring 55. Inlet valve 54 opens from spring chamber 23 into spring cavity 49 typically at a pressure of 85 psi.

AIR-ASSIST FUNCTION

As previously described with respect to the typical "Add-On" or "Piggy-Back" spring emergency or parking brake function, when sufficient air pressure is introduced through fitting 21 and passage 22 into spring chamber 23 in order to release the vehicle parking brakes, the piston moves to the position shown in FIG. 1, namely, compressing the power spring 32.

After air pressure has risen in chamber 23 to 85 psi (or any optional pressure desired or dictated by inlet valve 54), inlet valve 54 opens. This allows air in excess of 85 psi (or other set pressure) to enter spring cavity 49.

If air pressure is above 35 psi (or any desired and set limit in the application at hand), vent valve 16 opens and bleeds off any excess pressure. This feature maintains a controlled pressure charge in the spring cavity. This pressure must be balanced to the pressure available and the desired design performance of the vehicle.

When an emergency stop situation arises, that is, when air pressure is suddenly lost from spring chamber 23, there is caused a pressure unbalanced situation to exist with respect to piston 24. Air pressure excess in cavity 49 provides force to assist power spring 32 in making a faster emergency stop.

Check valve 52 opens downwardly or inwardly into the spring chamber 23 in the view of FIG. 1 from spring cavity 49. Due to the structure of check valve 52, it takes approximately 20 to 30 seconds to deplete the air in the spring cavity. This is adequate, when combined with the power spring 32 force, to stop a high speed vehicle and result in a stopping force which is great at first, then gradually slacking off as the vehicle speed decreases. This is considerably analogous to a theoretically desired high speed stop in an automobile, fully controlled.

After the air has been bled from the spring cavity 49, the cycle is ready for a repeat. It is not necessary to deplete the air, to repeat the cycle, but there would be required higher air pressure within spring chamber 23 before the parking brake could be released. Check valve 52 times the back flow.

MAXI ACTUATOR

FIG. 2 shows the subject internal air assisted brake actuator in the form wherein the spring emergency chamber is positioned inboard of the service chamber. An elongate cylindrical housing 60 has an inner (inward toward the axle or brake mechanism) end 61. Inner end 61 has an outwardly stepped central portion 62 having central opening 63 centrally thereof. The outward end of housing 60 is preferably slightly outwardly bowed as at 64 with terminal flange 65. Air pressure release opening 66 is provided therein.

The service chamber of the brake actuator of FIG. 2 has removable outer wall 67 with inner flange 68 thereof engaging diaphragm 69 and being engaged by clamp band 70. Fitting 71 provides for an input of air into service chamber 72.

Median wall 73 divides the service chamber from the spring emergency chamber. Wall 73 has central opening therein 74 with O-ring 75 positioned centrally of the passage of the opening. A brake rod 76 has fixed to one end thereof pad 77 and extends through opening 74 with seal 75 bearing there against. Return spring 78 bears at its inward end against wall 73 and at its outer end against spring retainer 79.

On the inward side of wall 73, peripheral to opening 74 there is provided our spring retaining flange 80. The outer flange 73a of wall 73 is fixed centrally of housing 60 by spaced screws or bolts 81 and has a circumferential seal 82 in circumferential groove 83 in the outer or peripheral face thereof. Wall 73 also is tapped as at 84 to receive threaded fitting 85 which also passes through opening 86 in housing 60. Power spring 87 bears at its outward end against the inward surface of wall 73 and at its inner end against the outward surface of power piston 88. Piston 88 has peripheral skirt 89 with seal 90 and lubricating ring 91 in circumferential grooves 92 and 93, respectively. Central of piston 88, there is provided outwardly dished portion 94 having one threaded opening 95 positioned in the central portion thereof and a non-threaded passage 96 therewithin having lesser diameter inward portion 97 connected thereto. The outer central portion of piston 88 in ring 98 has O-ring seal 99 received in circumferential groove 100. A hollow tube 101 is fixed by suitable means at 102 to piston 88 inwardly and central thereof. Flexible joint 103 connects brake rod 76 with its extension 104 passing through tube 101 and having externally threaded portion 105 upon which is threaded nut 106.

Fitting 107 having opening 108 therethrough is received in housing 60 adjacent the inward end thereof. Bolts 109 and 110 having circumferential seals 111 and 112, respectively, are received in openings 113 and 114 in housing end 61. Ring 115 is received within opening 63 and has seal 116 sealing said opening and seal 117 sealing against the outer surface of tube 101.

Included among the advantages of the brake actuator of FIG. 2 with respect to the brake actuator FIG. 1 are the possibilities of all steel structure in the type actuator of FIG. 2, whereas wall 19 in FIG. 1 is die-cast material. Further, the actuator of FIG. 2 has relatively smaller length than that of FIG. 1 which is required in certain applications where space is important. Yet, further, any defect in the mounting of the brake actuator caused by any means results in setting off the spring brake, whereby a fail safe unit is provided. Further, in the event of failure of an add-on type unit at the clamp band 41, the entire unit would escape the vehicle which results in the loss of both the service and emergency brake functions. Finally, the service diaphragm is accessible without disturbing the rest of the brake in the standard-type brake of FIG. 2.

AIR ASSIST FUNCTION IN MAXI ACTUATOR

When sufficient air pressure is introduced, referring to FIG. 2, into fitting 107 and passage 108 into the spring chamber between the inner end of the housing 61 and the piston 88, the piston moves to the position shown in FIG. 2, namely, compressing the power spring 87.

After air pressure has risen in the chamber 120 to 85 psi (or any optional pressure desired or dictated by inlet valve 96), this allows air in excess of 85 psi (or other set pressure) to enter spring cavity 121.

If air pressure is above 35 psi (or any desired and set limit in the application at hand), vent valve 85a opens and bleeds off any excess pressure. This feature maintains a controlled pressure charge in the spring cavity 121. The pressure must be balanced to the pressure available and the desired design performance of the vehicle.

When an emergency stop situation arises, that is, when air pressure is suddenly lost from spring chamber 120, there is caused a pressure unbalanced situation to exist with respect to piston 88. Air pressure excess in cavity 121 provides force to assist power spring 87 in making a faster emergency stop.

Check valve 95a opens downwardly or inwardly into the spring chamber 120 in the view of FIG. 2 from spring cavity 121. Due to the structure of check valve 95a, it takes approximately 20 to 30 seconds to deplete the air in the spring cavity 121. This is adequate, when combined with the power spring 87 force, to stop a high speed vehicle and result in a stopping force which is great at first, then gradually slackening off as the vehicle speed decreases. This is considerably analogous to a theoretically desired high speed stop in an automobile, fully controlled.

After the air has been bled from the spring cavity 121, the cycle is ready for a repeat. It is not necessary to deplete the air, to repeat the cycle, but there would be required higher air pressure within spring chamber 120 before the parking brake could be released. Check valve 95a times the back flow.

Any regulation of the system pressure, either by selection of govenor setting or introduction of a pressure regulating valve dictates whether the air assist feature would be in effect. That is, referring to the air assist function described with respect to the add-on and maxi actuators, if the air pressure in chambers 23 or 120, in the examples given, never rises above 85 psi or the optional pressure desired or dictated by the inlet valves 54 or 96a, air will not enter spring cavity 49 or spring cavity 121. Any air which does enter the spring cavity above 85 psi, but below the 35 psi indicated for the examples where the vent valve 85a or 16 open and bleed off will serve to give a limited air assist.

In modulation of application of the brake within the time period of the check valves 52 and 95a (in order to overcome wheel slide), such modulation works against the air assist behind the piston.

It is entirely possible to operate the system with the check valves 95a and 52 removed therefrom, and passages 50 and 95 closed off. In such case, there is lost the bleed down of the system which removes the air assist effect which aides in the recompression of the spring. When air is input through fitting 108 or opening 22 into cavities 120 and 23, respectively, without the check valves 95a or 52, recompression is against residual air in the spring cavity 121 or 49. If the vent valves 85a and 16 are present, the recompression is never against more than the 35 psi indicated in the examples in the systems given as examples.

It is further feasible to operate the systems with the vent valves 85a and 16 removed therefrom, but, in such case, it is best that the check valves 95a and 52 be present in order that there be a bleed down of the air assist function prior to recompression.

It is desirable that the combined spring pressure and air assist function pressure never exceed the system pressure.

An important feature of this system is that, when the vehicle is loaded, and it is desired to have the maximum effective breaking power, the air in the system which charges chambers 23 and 120 can be maintained at a pressure, for the examples given, of 120 lbs. This means that the air assist chamber will be charged over 35 lbs. in the examples given. Once the vehicle is unloaded, the system may be controlled by a govenor or the introduction of a pressure regulating valve to charge no more than 85 lbs. through openings 22 or 108 whereby the air assist function would not be operative on a lightly loaded or unloaded vehicle. This would prevent wheel skid from excessive brake application. Therefore a degree of weight control of the braking system is possible by regulating the input to the chambers 23 and 120 below 75 to 85 pounds on the inlet valves 54 and 96a. One may therefore put in or cut out the air assist. The operator would be instructed to actuate the govenor or pressure regulating valve when the vehicle was unloaded.

Inlet valves 96a or 54 crack at 75 to 85 lbs., plus or minus 2 lbs. (73–87). Same are semi-adjustable by dropping in a shim. The pressure in the chambers 121 and 49 are set from 30 to 40 pounds with a tolerance of plus or minus 2. That is, 28 to 42 lbs. Vent valves 85a or 16 have a cracking pressure of 40 lbs., plus 5, minus 0, that is 40 to 45 lbs. before it opens. There is an overlap of 2 lbs. between valve 54 closing and valve 16 opening. Vent valve 16 ranges from cracking pressure down to 20 percent and will close when the pressure in cavity 49 drops 20 percent to 31 to 32 lbs.

Check valves 95a and 52 are back flow timing check valves. They seal bubble tight at plus 2 lbs. and crack at 1 to 5 lbs. plus or minus 2. (3 lbs.) A typical timing rate for the check valves would be 24 seconds to exhaust plus or minus 5 a 75 cubic inch chamber in chambers 121 or 49 compressed at 30 psi.

Looking at FIG. 3, valve 95a has thread 95b on body portion 95c which has relatively large diameter opening 122 therethrough which terminates in lesser diameter dead-end passage 123. A plurality of orifices (four in number typically) 124 reach outwardly into lesser diameter portion 125 of the check valve. A seal-ring 126 fits over the orifices in the groove 125. Openings 124 are sized to give the throttling effect described immediately above.

SPRINGLESS AIR ASSIST FUNCTION

Referring to FIG. 2, it will be seen that, even with spring 87 removed from cavity 121 in the assembly, the piston 88 can be moved upwardly in the view by air input through fitting 108, also aided by diaphragm return spring 78. An excess of air pressure over that required to actuate inlet valve 96a will cause cavity 121 to fill with pressurized air to the degree the pressure in cavity 120 exceeds the pressure required to actuate inlet valve 96a. Should cavity 120 lose pressure from loss of general system pressure and loss of service brake function, the piston 88 will be moved downwardly in view of FIG. 2 under the air pressure contained in cavity 121 to exert a limited air pressurized emergency brake function.

Since the power of the piston with the spring removed would be limited totally to what air could be put into chamber 121 over the resistance of inlet valve 96a there would be no need for the relief or pop valve 85a. Further, while valve 95a, the bleed down valve, would be somewhat useful in exhausting any residual air chamber 121 pressure after the expansion, such would be of no great significance in the recompression of piston 88 back towards bulk head 73 and thus valve 95a could be removed with the openings which receive them (valves 85a and 95a) sealed. In short, the provision of a piston 88 in the structure of FIG. 2, with valves 95a and 85a removed and their openings sealed and power spring 87 removed would also give air assist effect.

The above remarks apply to FIG. 1 in that, referring to chamber 49, the power spring 32 could be removed and piston 24 would then be operated by the air assist function alone by air entering through inlet valve 54 from original pressurization of chamber 23 through passage 22. The springless chamber 49 will be charged with excess air pressure through inlet valve 54 after piston 24 has been compressed back to the position of FIG. 1, the excess being that of the system over the set pressure of the inlet valve 54. When pressure goes out of chamber 23 due to loss of system pressure, the piston 24 moves downwardly in the view of FIG. 1 and sets the vehicle brake. In the case of both the add-on and spring-forward actuators of FIG. 1 and FIG. 2 respectively, it may thus be seen that springless air assist may be achieved in the manner described. Likewise, in FIG. 1, the valves 52 and 16 preferably would be removed. With respect to the figures previously given with respect to the relative forces of the spring employed and the air assist in cavity in 49 of 121, it was seen that the spring was a major proportion of the force used and the air assist portion a relatively lesser same. However, without these springs, it is possible to adjust inlet valve 54 or inlet valve 96a so that the air pressurization into chamber 49 or 121 is up to an amount equal the supply pressure less normal friction and less normal opening and closing pressure range of the inlet valves, and any residual pressure in chamber 49 or 121. The spring 32 and 87 strength values may be varied as desired from the relatively heavy values of the earlier examples of FIGS. 1 and 2 to a very low value depending primarily on the air assist function.

In all of the forms discussed, it should be understood that diaphragms could be substituted for pistons 88 and 24. Discs would have to be received through the diaphragm for valve insertions such as 96a, 95a, 54 and 52 with the said diaphragms fastened centrally as at 102 and to rod 30 in FIG. 1 to perform the functions of the movable piston.

With respect to inlet valves 54 and 96a, spring 32 or 57 plus the inlet valve 96a or 54 value plus 10 lbs. equals the supply pressure to chamber 23. The setting of the vent valves 16 and 85a equals the supplied pressure minus the inlet valve setting plus 5 lbs. The back flow check valves 95a and 52 are variable time depending on the application. For example, in an intercity bus, a considerably shorter stop time is required than in a truck because same is lighter, slower and people are involved.

The application of the springless air assist would be particularly apt on a tandem axle truck, for example, where no brake is required on the front axle and braking units apply to the two rear axles. One of the rear axles could employ the springless air assist (no power spring 32 and 87 in the two brake units) while the other axle could employ both air assist and spring as in FIGS. 1 or 2. In this manner, requirements for primary braking (diaphragms 39 and 69), enhanced secondary braking (pistons 24 and 88 with and without power springs) and parking (pistons 24 and 88 and springs 32 and 87) will be satisfied.

A wedge brake installation has two floating shoes which can be actuated by (1) two service chambers, (2) two spring emergency chambers as in FIG. 1 or 2, or (3) one of each. In the case of number 2, one of these could be a springless air assist chamber, the other air assist with spring. The latter case gives the parking function as well as primary and secondary braking functions.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcomninations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. In a brake actuating device having spring emergency and parking functions and having operable connection with the braking mechanism of a motor vehicle and comprising, a closed housing divided into inner and outer compartments, a flexible diaphragm peripherally secured in the outer compartment, a brake operating rod surmounted by a diaphragm abutment plate extending axially through the inner and outer compartments and having attachment to the braking mechanism, a movable wall mounted within the inner compartment equipped with a tubular axial extension surrounding and having abutting engagement at its inner end with said rod, an annular member forming the partition between the inner and outer compartments, a power compression spring unit between said annular member and movable wall, a rod return compression spring between the diaphragm abutment plate and annular member;

separate air inlets for introducing compressed air to the inner compartment between the movable wall and the inner end of the housing and to the outer compartment between the diaphragm and the outer end of the housing, the improvements which comprise said movable wall, centrally thereof, slidingly sealed in pressure retaining fashion to the brake operating rod, said annular member also slidingly sealed in pressure retaining fashion to said brake operating rod, said annular member and movable wall seals on the brake operating rod, together with the member and wall, defining therebetween a sealed air assist chamber, the tubular axial extension of the movable wall extending through the inner end of the housing in sliding sealed fashion whereby to define peripherally thereof within the housing and between the inner end of the housing and the inner face of the movable wall a movable wall pressurization chamber, at least one passage through said movable wall having inlet valve means permitting air flow from the movable wall pressurization chamber into the air assist chamber when the pressure in the movable wall pressurization chamber reaches a certain predetermined level, and check valve means therein checking flow from the movable wall pressurization chamber into the air assist chamber and permitting flow in opposite direction under certain conditions.

2. A brake actuating device as in claim 1 including a vent valve from the air assist chamber exterior of said closed housing operative to vent pressure from said air assist chamber outside of housing at a predetermined pressure level within said air assist chamber.

3. A device as in claim 1 wherein the check valve means and the inlet valve means through the movable wall communicating between the air assist chamber and the movable wall pressurization chamber are positioned within separate passages through said movable wall.

4. In combination, a housing, said housing having inner and outer ends with respect to a vehicle brake mechanism, one end of said housing closed by an inner wall member having a central opening therethrough, the other end of said housing closed by an outer wall member, a movable wall within said housing with the outer face thereof next to the outer wall member of said housing, coil compression spring means seating between said movable wall outer face and housing outer wall member, a rod connected at one end thereof centrally of said movable wall, extending inwardly of the latter and having a sliding fit through the inner wall member central opening, an air inlet into said housing between the inner wall member and the inner face of the movable wall whereby to permit pressurization of a movable wall pressurization chamber defined between said movable wall and inner wall member, the movable wall outer face and outer wall member defining therebetween an air assist chamber, at least one opening through said movable wall communicating from said movable wall pressurization chamber to said air assist chamber and having inlet feed valve means operative at a predetermined pressure level to pass air pressure from said movable wall pressurization chamber into said air assist chamber, and check valve means therein checking flow into the air assist chamber and permitting flow therefrom under certain conditions.

5. A device as in claim 4 including a relief valve in said outer wall member operative to relieve the air assist chamber defined between the movable wall outer face and outer wall member at a predetermined pressure therein.

6. A device as in claim 4 wherein the check valve means and the inlet valve means through the movable wall communicating between the air assist chamber and the movable wall pressurization chamber are positioned within separate passages through said movable wall.

7. Brake actuating mechanism comprising a closed housing having inner and outer walls, said walls inner and outer with respect to a vehicle brake mechanism, a flexible diaphragm within said housing peripherally secured in place, means for introducing fluid under pressure to said housing adjacent the outer wall thereof and on the outer side of said diaphragm, a brake operating rod on the other, inner side of said diaphragm axially arranged relative thereto, said rod projecting through the inner end wall of the housing for reciprocatory movements, a pad on the outer end of said brake or rod operable to bear against said diaphragm an auxiliary compartment at one end of said housing, the outer end wall of said housing constituting the inner end wall of said compartment, the inner end wall of the compartment having a central opening therethrough, the outer end of said compartment closed by an outer wall member, a movable wall within said compartment with the outer face thereof facing the outer wall of said compartment, coil compression spring means seating between said movable wall outer face and compartment outer wall member, a rod connected centrally with said movable wall, extending inwardly thereof and having a sliding fit through the housing outer end wall central opening, means for introducing fluid under pressure to said compartment adjacent to the housing outer wall for normally holding the movable wall in the region of the compartment outer wall thereby to hold said coil compression spring means under compression, said fluid under pressure introduced into a movable wall pressurization chamber between the movable wall inner face and the housing outer wall outer face, at least one passage through said movable wall connecting the movable wall pressurization chamber and the air assist chamber with check valve means therein checking flow from the movable wall pressurization chamber to the air assist chamber while permitting flow in the other direction under certain pressurization conditions and inlet valve means operative to pass fluid under pressure from the movable wall pressurization chamber to the air assist chamber when the pressure level within the movable wall pressurization chamber rises above a predetermined level.

8. A brake actuating mechanism as in claim 7 including a vent valve in the outer end wall of said compartment operative to vent the air assist chamber defined by the movable wall outer face and the inner face of the compartment outer wall.

9. A device as in claim 7 wherein the check valve means and the inlet valve means through the movable wall communicating between the air assist chamber and the movable wall pressurization chamber are positioned within separate passages through said movable wall.

10. In a brake actuating device having spring emergency and parking functions, operable connection with the braking mechanism of a vehicle and comprising,
  a closed housing divided into inner and outer compartments,
  a flexible diaphragm peripherally secured in the outer compartment,
  a brake operating rod surmounted by a diaphragm abutment plate extending axially through the inner and outer compartments and having attachment to the braking mechanism,
  a movable wall mounted within the inner compartment equipped with a tubular axial extension surrounding and having abutting engagement at its inner end with said rod,
  an annular member forming the partition between the inner and outer compartments,
  a power compression spring unit between said annular member and movable wall,
  a rod return compression spring between the diaphragm abutment plate and annular member,
  separate air inlets for introducing compressed air to the inner compartment between the movable wall and the inner end of the housing and to the outer compartment between the diaphragm and the outer end of the housing,
  the improvements which comprise
  said movable wall, centrally thereof, slidingly sealed in pressure retaining fashion to the brake operating rod,
  said annular member also slidingly sealed in pressure retaining fashion to said brake operating rod,
  said annular member and movable wall seals on the brake operating rod, together with the member and wall, defining therebetween a sealed air assist chamber,
  the tubular axial extension of the movable wall extending through the inner end of the housing in sliding sealed fashion, whereby to define peripherally thereof within the housing and between the inner end of the housing and the inner face of the movable wall a movable wall pressurization chamber,
  at least one air flow passage having inlet valve means therewithin permitting air flow from the movable wall pressurization chamber into the air assist chamber, when the pressure in the movable wall pressurization chamber reaches a certain predetermined level.

11. A device as in claim 10 including check valve means in a passage communicating between the movable wall pressurization chamber and air assist chamber checking air flow from the movable wall pressurization chamber into the air assist chamber and permitting air flow in opposite direction under certain conditions.

12. A brake actuating device as in claim 10 including a vent valve from the air assist chamber exterior of said closed housing operative to vent pressure from said air assist chamber outside of said housing at a predetermined pressure level within said air assist chamber.

13. A device as in claim 10 wherein the check valve means and the inlet valve means communicating between the air assist chamber and the movable wall pressurization chamber are positioned within separate passages.

14. A brake actuating device as in claim 11 including a vent valve from the air assist chamber exterior of said closed housing operative to vent pressure from said air assist chamber outside of said housing at a predetermined pressure level within said air assist chamber.

15. In combination,
  a housing,
  said housing having inner and outer ends with respect to a vehicle brake mechanism,
  one end of said housing closed by an inner wall member having a central opening therethrough,
  the other end of said housing closed by an outer wall member,
  a movable wall within said housing with the outer face thereof next to the outer wall member of said housing,
  coil compression spring means seating between said movable wall outer face and housing outer wall member,
  a rod connected at one end thereof centrally of said movable wall, extending inwardly of the latter and having a sliding fit through the inner wall member central opening,
  an air inlet into said housing between the inner wall member and the inner face of the movable wall, whereby to permit pressurization of a movable wall pressurization chamber defined between said movable wall and inner wall member,
  the movable wall outer face and outer wall member defining therebetween an air assist chamber, and
  at least one air flow passage communicating between said movable wall pressurization chamber and said air assist chamber and having inlet (feed) valve means positioned therein operative at a predetermined pressure level to pass pressurized air from said movable wall pressurization chamber into said air assist chamber(.)
  when, and only when, the fluid pressure in said chamber exceeds a predetermined level which is beyond that required to compress the power spring,
  but to prevent flow in the opposite direction and thereby provide a force tending to move the movable wall to apply the brake upon reduction of pressure in the chamber into which the supply of pressure fluid is normally introduced.

16. A device as in claim 15 including check valve means in a passage communicating between the movable wall pressurization chamber and air assist chamber checking air flow into the air assist chamber from the movable wall pressurization chamber and permitting air flow therefrom under certain conditions.

17. In combination,
a housing,
said housing having inner and outer ends with respect to a vehicle brake mechanism,
one end of said housing closed by an inner wall member having a central opening therethrough,
the other end of said housing closed by an outer wall member,
a movable wall within said housing with the outer face thereof next to the outer wall member of said housing,
coil compression spring means seating between said movable wall outer face and housing outer wall member,
a rod connected at one end thereof centrally of said movable wall, extending inwardly of the latter and having a sliding fit through the inner wall member central opening,
an air inlet into said housing between the inner wall member and the inner face of the movable wall, whereby to permit pressurization of a movable wall pressurization chamber defined between said movable wall and inner wall member,
the movable wall outer face and outer wall member defining therebetween an air assist chamber, and
at least one air flow passage communicating between said movable wall pressurization chamber and said air assist chamber and having inlet feed valve means therein operative at a predetermined pressure level to pass pressurized air from said movable wall pressurization chamber into said air assist chamber(.)
check valve means in a passage communicating between the movable wall pressurization chamber and air assist chamber checking air flow into the air assist chamber from the movable wall pressurization chamber and permitting air flow therefrom under certain conditions, and
(A device as in claim 20 including) a relief valve operative to relieve the air assist chamber defined between the movable wall outer face and outer wall member at a predetermined pressure therein.

18. In combination,
a housing,
said housing having inner and outer ends with respect to a vehicle brake mechanism,
one end of said housing closed by an inner wall member having a central opening therethrough,
the other end of said housing closed by an outer wall member
a movable wall within said housing with the outer face thereof next to the outer wall member of said housing,
coil compression spring means seating between said movable wall outer face and housing outer wall member,
a rod connected at one end thereof centrally of said movable wall, extending inwardly of the latter and having a sliding fit through the inner wall member central opening,
an air inlet into said housing between the inner wall member and the inner face of the movable wall, whereby to permit pressurization of a movable wall pressurization chamber defined between said movable wall and inner wall member,
the movable wall outer face and outer wall member defining therebetween an air assist chamber, and
at least one air flow passage communicating between said movable wall pressurization chamber and said air assist chamber and having inlet feed valve means therein operative at a predetermined pressure level to pass pressurized air from said movable wall pressurization chamber into said air assist chamber(.), and
(A device as in claim 19 including) a relief valve operative to relieve the air assist chamber defined between the movable wall outer face and outer wall member at a predetermined pressure therein.

19. Brake actuating mechanism comprising
a closed housing having inner and outer walls,
said walls inner and outer with respect to a vehicle brake mechanism,
a flexible diaphragm within said housing peripherally secured in place,
means for introducing fluid under pressure to said housing adjacent the outer wall thereof and on the outer side of said diaphragm,
a brake operating rod on the other, inner side of said diaphragm axially arranged relative thereto,
said rod projecting through the inner end wall of the housing for reciprocatory movements,
a pad on the outer end of said brake or rod operable to bear against said diaphragm,
an auxiliary compartment at one end of said housing,
the outer end wall of said housing constituting the inner end wall of said compartment,
the inner end wall of the compartment having a central opening therethrough,
the outer end of said compartment closed by an outer wall member,
a movable wall within said compartment with the outer face thereof facing the outer wall of said compartment,
coil compression spring means seating between said movable wall outer face and compartment outer wall member,
a rod connected centrally with said movable wall, extending inwardly thereof and having a sliding fit through the housing outer end wall central opening,
means for introducing fluid under pressure into a movable wall pressurization chamber between the movable wall inner face and the housing outer wall outer face, thus normally holding the movable wall in the region of the compartment outer wall thereby to hold said coil compression spring means under compression,
a passage interconnecting the movable wall pressurization chamber and the air assist chamber;
inlet valve means in said passage so positioned and so functioning as to pass fluid under pressure from the movable wall pressurization chamber to the air assist chamber when and only when the pressure level within the movable wall pressurization chamber rises above a predetermined level which is beyond that required to compress the power spring, but to prevent flow in the opposite direction and thereby provide a force tending to move the dividing wall to apply the brake upon reduction of pressure in the compartment into which the supply of pressure fluid is normally introduced.

20. A device as in claim 19 including check valve means in a passage interconnecting the movable wall pressurization chamber and the air assist chamber checking air flow from the movable wall pressurization chamber to the air assist chamber while permitting air flow in the other direction under certain pressurization conditions.

21. A brake actuating mechanism as in claim 19 including a vent valve operative to vent to atmosphere the air assist chamber (defined by the movable wall outer face and the inner face of the compartment outer wall) at a predetermined pressure level therein.

22. In a brake actuating device having emergency and parking functions, operable connection with the braking mechanism of a vehicle and comprising,
   a closed housing divided into inner and outer compartments,
   a flexible diaphragm peripherally secured in the outer compartment,
   a brake operating rod surmounted by a diaphragm abutment plate extending axially through the inner and outer compartments and having attachment to the braking mechanism,
   a movable wall mounted within the inner compartment equipped with a tubular axial extension surrounding and having abutting engagement at its inner end with said rod,
   an annular member forming the partition between the inner and outer compartments,
   a rod return compression spring between the diaphragm abutment plate and annular member,
   separate air inlets for introducing compressed air to the inner compartment between the movable wall and the inner end of the housing and to the outer compartment between the diaphragm and the outer end of the housing,
   the improvements which comprise
   said movable wall, centrally thereof, slidingly sealed in pressure retaining fashion to the brake operating rod,
   said annular member also slidingly sealed in pressure retaining fashion to said brake operating rod,
   said annular member and movable wall seals on the brake operating rod, together with the member and wall, defining therebetween a sealed air assist chamber,
   the tubular axial extension of the movable wall extending through the inner end of the housing in sliding sealed fashion, whereby to define peripherally thereof within the housing and between the inner end of the housing and the inner face of the movable wall a movable wall pressurization chamber,
   at least one air flow passage having inlet valve means therewithin permitting air flow from the movable wall pressurization chamber into the air assist chamber, when the pressure in the movable wall pressurization chamber reaches a certain predetermined level.

23. A device as in claim 22 including check valve means in a passage communicating between the movable wall pressurization chamber and air assist chamber checking air flow from the movable wall pressurization chamber into the air assist chamber and permitting air flow in opposite direction under certain conditions.

24. A device as in claim 22 including a vent valve from the air assist chamber exterior of said closed housing operative to vent pressure from said air assist chamber outside of said housing at a predetermined pressure level within said air assist chamber.

25. A device as in claim 22 wherein the check valve means and the inlet valve means communicating between the air assist chamber and the movable wall pressurization chamber are positioned within separate passages.

26. In combination,
   a housing,
   said housing having inner and outer ends with respect to a vehicle brake mechanism,
   one end of said housing closed by an inner wall member having a central opening therethrough,
   the other end of said housing closed by an outer wall member,
   a movable wall within said housing with the outer face thereof next to the outer wall member of said housing,
   a rod connected at one end thereof centrally of said movable wall, extending inwardly of the latter and having a sliding fit through the inner wall member central opening,
   an air inlet into said housing between the inner wall member and the inner face of the movable wall, whereby to permit pressurization of a movable wall pressurization chamber defined between said movable wall and inner wall member,
   the movable wall outer face and outer wall member defining therebetween an air assist chamber,
   at least one air flow passage communicating between said movable wall pressurization chamber and said air assist chamber and having inlet feed valve means positioned therein and so functioning as to be operative at a predetermined pressure level to pass pressurized air from said movable wall pressurization chamber into said air assist chamber(.)
   when, and only when, the fluid pressure in said compartment exceeds a predetermined level which is beyond that required to compress the power spring,
   but to prevent flow in the opposite direction and thereby provide a force tending to move the dividing wall to apply the brake upon reduction of pressure in the compartment into which the supply of pressure fluid is normally introduced.

27. A device as in claim 26 including check valve means in a passage communicating between the movable wall pressurization chamber and air assist chamber checking air flow into the air assist chamber from the movable wall pressurization chamber and permitting air flow therefrom under certain conditions.

28. A device as in claim 26 including a (relief) vent valve operative to relieve to atmosphere the air assist chamber (defined between the movable wall outer face and outer wall member of the) at a predetermined pressure level therein.

29. Brake operating equipment of the kind comprising a brake actuating member reciprocable in brake applying and brake releasing directions, the brake operating equipment being divided into two sections respectively operating as service and emergency braking devices, the service braking device including a fluid pressure chamber having a supply connection providing for introduction of pressure fluid and having a reciprocable fluid pressure responsive wall element for imparting brake applying motion to the brake actuating member, the equipment being characterized in that the emergency braking device includes a fluid pressure chamber, a reciprocable element forming a wall dividing the pressure chamber of the emergency device into two compartments, said wall being movable in one direction to effect emergency application of the brake, a supply connection normally providing for introduction of pressure fluid into that one of the compartments in which pressure acting on said wall tends to move the wall in the other direction, a passage interconnecting said two compartments, and an inlet valve in said passage positioned and so functioning as to provide for fluid flow from said one compartment into the other when, and only when, the fluid pressure in said compartment exceeds a predetermined level which is beyond that required to compress the power spring, but to prevent flow in the opposite direction and thereby provide a force tending to move the dividing wall to apply the brake upon reduction of pressure in the compartment into which the supply of pressure fluid is normally introduced.

30. A device as in claim 29 including a vent valve from one of said compartments exterior to atmosphere thereof operative to vent pressure therefrom at a predetermined pressure level within said compartment.

31. Brake operating equipment of the kind comprising a brake actuating member reciprocable in brake applying and brake releasing directions, the brake operating equipment being divided into two sections respectively operating as service and emergency braking devices, the service braking device including a fluid pressure chamber having a supply connection providing for introduction of pressure fluid and having a reciprocable fluid pressure responsive wall element for imparting brake applying motion to the brake actuating member, the equipment being characterized in that the emergency braking device includes a fluid pressure chamber, a reciprocable element forming a wall dividing the pressure chamber of the emergency device into two compartments, said wall being movable in one direction to effect emergency application of the brake, a supply connection normally providing for introduction of pressure fluid into that one of the compartments in which pressure acting on said wall tends to move the wall in the other direction, a passage interconnecting said two compartments, and an inlet valve in said passage positioned to provide for fluid flow from said one compartment into the other but to prevent flow in the opposite direction and thereby provide a force tending to move the dividing wall to apply the brake upon reduction of pressure in the compartment into which the supply of pressure fluid is normally introduced(.), and check valve means in a passage interconnecting the two compartments checking air flow from one compartment into the other and permitting air flow in the opposite direction under certain conditions.

32. Brake operating equipment of the kind comprising a brake actuating member reciprocable in brake applying and brake releasing directions, the brake operating equipment being divided into two sections respectively operating as service and emergency braking devices, the service braking device including a fluid pressure chamber having a supply connection providing for introduction of pressure fluid and having a reciprocable fluid pressure responsive wall element for imparting brake applying motion to the brake actuating member, the equipment being characterized in that the emergency braking device includes a fluid pressure chamber, a reciprocable element forming a wall dividing the pressure chamber of the emergency device into two compartments, said wall being movable in one direction to effect emergency application of the brake, a spring acting on said wall to urge it to move in said one direction, a supply connection normally providing for introduction of pressure fluid into that one of the compartments in which pressure acting on said wall tends to move the wall in the other direction to thereby provide for compression of said spring, a passage interconnecting said two compartments, and an inlet valve in said passage positioned and so functioning as to provide for fluid flow from said one compartment into the other when, and only when, the fluid pressure in said compartment exceeds a predetermined level which is beyond that required to compress the power spring, but to prevent flow in the opposite direction and thereby provide a force tending to move the dividing wall to apply the brake upon reduction of pressure in the compartment into which the supply of pressure fluid is normally introduced.

33. A device as in claim 32 including check valve means in a passage interconnecting said two compartments checking air flow from one compartment into the other and permitting air flow in opposite direction under certain conditions.

34. Brake operating equipment of the kind comprising a brake actuating member reciprocable in brake applying and brake releasing directions, the brake operating equipment being divided into two sections respectively operating as service and emergency braking devices, the service braking device including a fluid pressure chamber having a supply connection providing for introduction of pressure fluid and having a reciprocable fluid pressure responsive wall element for imparting brake applying motion to the brake actuating member, the equipment being characterized in that the emergency braking device includes a fluid pressure chamber, a reciprocable element forming a wall dividing the pressure chamber of the emergency device into two compartments, said wall being movable in one direction to effect emergency application of the brake, a spring acting on said wall to urge it to move in said one direction, a supply connection normally providing for introduction of pressure fluid into that one of the compartments in which pressure acting on said wall tends to move the wall in the other direction to thereby provide for compression of said spring, a passage interconnecting said two compartments, and an inlet valve in said passage positioned to provide for fluid flow from said one compartment into the other but to prevent flow in the opposite direction and thereby provide a force tending to move the dividing wall to apply the brake upon reduction of pressure in the compartment into which the supply of pressure fluid is normally introduced(.) , and a vent valve from one of said compartments operative to vent pressure from said compartment to atmosphere outside thereof at a predetermined pressure level within said compartment.

* * * * *